United States Patent [19]

Levande et al.

[11] 4,381,594
[45] May 3, 1983

[54] METHOD OF COLD FORMING COUPLING SHELL

[75] Inventors: George A. Levande; Frederick J. Schwarzenbart, both of Manitowoc, Wis.

[73] Assignee: Imperial Clevite Inc., Rolling Meadows, Ill.

[21] Appl. No.: 235,348

[22] Filed: Feb. 17, 1981

[51] Int. Cl.³ .............................................. B21K 1/16
[52] U.S. Cl. ...................................... 29/508; 72/370; 285/256; 285/332.4
[58] Field of Search ...................... 285/256, 259, 332.4; 72/356, 359, 370, 367, 348; 29/508

[56] References Cited

U.S. PATENT DOCUMENTS

| | | |
|---|---|---|
| 2,211,147 | 8/1940 | Miller . |
| 2,685,458 | 8/1954 | Shaw . |
| 3,056,197 | 10/1962 | Lawson ................................ 72/356 |
| 3,280,613 | 10/1966 | Schrom ................................ 72/359 |
| 3,371,408 | 3/1968 | Charbonnet . |
| 3,838,592 | 10/1974 | Goward et al. . |

Primary Examiner—Lowell A. Larson
Attorney, Agent, or Firm—Russell E. Baumann

[57] ABSTRACT

Method of cold forming a hose coupling wherein a shell element is drawn into a generally frusto-conical shape with at least one interior circular discontinuity.

3 Claims, 6 Drawing Figures

"F" STATION

"E" STATION

"D" STATION

"C" STATION

"B" STATION

"A" STATION

METHOD OF COLD FORMING COUPLING SHELL

BACKGROUND AND SUMMARY OF INVENTION

This invention relates to a method of making a hose coupling and, more particularly, to a method wherein the outer element is provided by cold forming, i.e., drawing, rather than machining.

The coupling for the end of a flexible hose normally has included an insert body of fairly rigid, tubular construction inserted within a hose end, and a deformable sleeve having interior serrations which is crimped or swaged, i.e., radially inwardly deformed, into clamping relation with the hose. Normally, the outer element or sleeve is manufactured by machining coupling shells from round or hexagonal bar stock or from tubing on turret lathes and screw machines. The disadvantage of this method is the time and scrap involed in machining the shells. However, no one has departed substantially from this technique because of the feeling that the serrations or tangs in the interior of the sleeve had to face downstream, i.e., oppose the direction of hose movement tending to separate the hose from the coupling. We have discovered, however, that an entirely satisfactory coupling can be obtained with the tangs developed upon swaging facing "upstream" so that now it is possible, for the first time, to dispense with the expensive machining operation and instead develop the deformable sleeve by cold forming, i.e., drawing.

More particularly, the invention contemplates the cold forming to develop a generally frusto-conical sleeve having at least one circular discontinuity in the interior wall thereof. This can be characterized by a step in the interior wall defined by the intersection of an axially extending wall portion and a radially extending wall portion. This, upon swaging or the like, develops an advantageously powerful compressive action on the hose which results in a firm union between the coupling and the hose itself.

The efforts of the prior art stopped far short of the instant invention. For example, in Shaw U.S. Pat. No. 2,685,458, the essential teaching is to a ferrule including serrations in the inner surface thereof formed by casting and machining. However, Shaw discloses that in instances it can be an advantage to use a drawn ferrule which is subsequently subjected to crimping but in such a case the serrations extend longitudinally rather than being radially disposed. Miller U.S. Pat. No. 2,211,147 also teaches longitudinally extending serrations in a shell formed in a cold forming process.

Goward et al U.S. Pat. No. 3,838,592, discloses a hose end fitting wherein a ferrule includes serrations formed on the outer surface but again are oriented so as to follow the prior teaching of having the tang like aspect directed downstream.

Other objects and advantages of the invention may be seen in the details of construction and operation set down in the ensuing specification.

DETAILED DESCRIPTION

The invention is described in conjunction with an illustrative embodiment in the accompanying drawing, in which—

Figure 1:
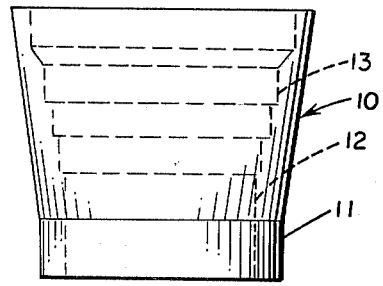
FIG. 1 is an elevational view of the preferred form of sleeve element made according to the teachings of this invention and suitable for incorporation into a hose coupling.
Figure 2:
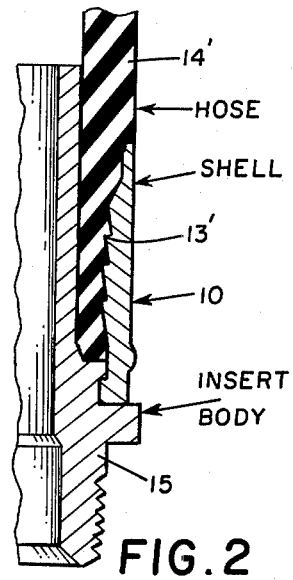
FIG. 2 is an enlarged fragmentary sectional view of a hose equipped with a coupling featuring the inventive sleeve or shell element.

In the illustration given and with reference to FIG. 1, the numeral 10 designates generally the inventive shell element as seen in side elevation. The element 10 is generally frusto-conical in exterior shape although, preferably, the smaller end thereof as at 11 may include a short cylindrical wall portion integral with the remainder of the element. The interior wall 12 is characterized by at least one circular discontinuity as at 13 which is developed by cold forming.

When the shell 10 is radially inwardly deformed as by crimping or swaging (after assembly about a hose 14 and an insert body 15, the circular discontinuities 13 develop into tangs as at 13'. However, in studied contrast to the prior art, these tangs project upstream rather than downstream—these directions being considered from the standpoint of the fluid ultimately flowing within the hose 14.

Figure 3:
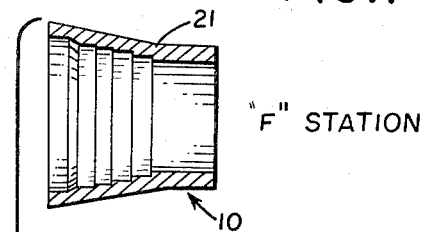
FIG. 3 is a multi-faceted view showing the progression of development of the inventive element by cold forming.
Figure 3:
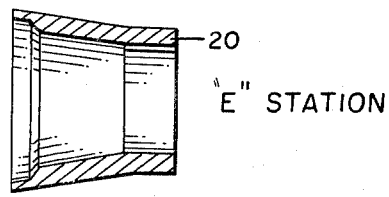
Figure 3:
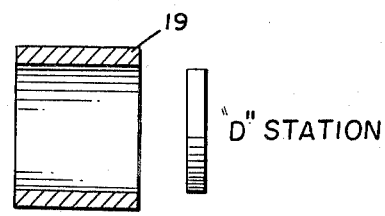
Figure 3:
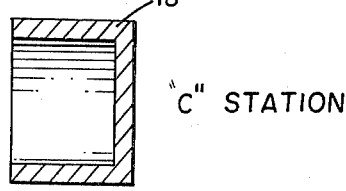
Figure 3:
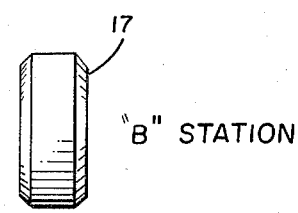
Figure 3:
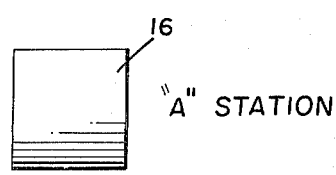

The development of the inventive shell element 10 can be appreciated from a consideration of FIG. 3. In FIG. 3, the "A" station discloses schematically a solid metal blank 16. The initial drawing or cold forming reshapes the element 16 into a radially expanded, end-tapered body 17 which thereafter is drawn into a cylindrical cup shape 18 as in the "C" station. At the "D" station, the end wall of the cup-shape is removed so as to develop a tubular body 19. At the "E" station, the tubular body 19 has been cold formed into an element which is generally frusto conical and at "F", a plurality of steps 21 have been introduced into the resulting element generally designated 10.

Figure 6:
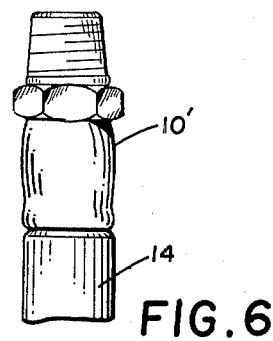
FIG. 6 is a view of the assembled hose coupling, i.e., the hose being compressively retained between the swaged exterior shell element and the insert body.
Figure 5:
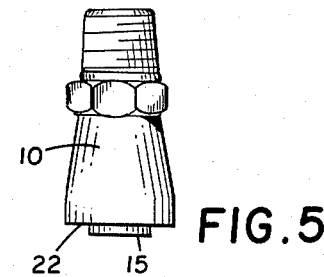
FIG. 5 is a perspective view of the insert body and shell element in assembled condition ready to receive a hose in the annular space provided therebetween.
Figure 4:
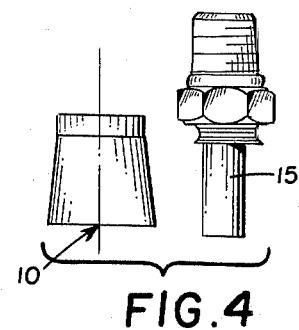
FIG. 4 is a perspective view of the insert body and shell element in disassembled condition.

The method of assembly or use of the inventive shell element can be appreciated from the sequence depicted in FIGS. 4–6. In FIG. 4, the shell element is again generally designated by the numeral 10 while the insert body is again designated 15, these being shown in side-by-side relation. The initial step of the assembly can include ensleeving the shell element 10 about the insert body 15 with the smaller diameter end of the frusto-conical shape being positioned downstream, i.e., toward what will be the end of the hose. In FIG. 6, the hose 14 has already been inserted in the annular space 22 (see FIG. 5) between the insert body 15 and the shell element with the latter being radially inwardly deformed as at 10' in FIG. 6 so as to achieve the advantageous compressive locking of the shell element to the hose and thereby achieving the completed coupling.

While in the foregoing specification, a detailed description of an embodiment of the invention has been set down for the purpose of illustration, many variations in the details hereingiven may be made by those skilled in the art without departing from the spirit and scope of the invention.

We claim:

1. A method of making a permanently attached hose coupling comprising successively drawing a metal blank to form a hollow generally frusto-conical element having a large diameter portion at one end and a small diameter portion at the other end and a stepped interior therebetween characterized by at least one substantially continuous circular discontinuity, assembling a rigid tubular body within a flexible hose and with said element ensleeved about said hose with said smaller diameter end adjacent the hose end, and thereafter radially inwardly deforming said element rendering its shape generally cylindrical so that said at least one circular discontinuity grips into said hose.

2. The method of claim 1 in which a plurality of axially related steps are provided in said element which, upon said deformation, are formed into tangs directed away from said hose end.

3. The method of claim 2 in which said small diameter end is characterized by a generally cylindrical wall integral with the remainder of said element, said steps being provided only in said element remainder.

* * * * *